(12) United States Patent
Filippov et al.

(10) Patent No.: US 12,422,614 B2
(45) Date of Patent: Sep. 23, 2025

(54) ACTIVE OPTICAL VORTEX FIBER

(71) Applicant: AMPLICONYX OY, Tampere (FI)

(72) Inventors: Valery Filippov, Tampere (FI); Yuriy Chamorovskiy, Moscow (RU)

(73) Assignee: AMPLICONYX OY, Tampere (FI)

( * ) Notice: Subject to any disclaimer, the term of this patent is extended or adjusted under 35 U.S.C. 154(b) by 0 days.

(21) Appl. No.: 18/000,537

(22) PCT Filed: Jun. 2, 2020

(86) PCT No.: PCT/FI2020/050381
§ 371 (c)(1),
(2) Date: Dec. 2, 2022

(87) PCT Pub. No.: WO2021/245320
PCT Pub. Date: Dec. 9, 2021

(65) Prior Publication Data
US 2023/0236357 A1    Jul. 27, 2023

(51) Int. Cl.
*G02B 6/036* (2006.01)
*G02B 6/02* (2006.01)
*G02B 6/10* (2006.01)

(52) U.S. Cl.
CPC ..... *G02B 6/03622* (2013.01); *G02B 6/02038* (2013.01); *G02B 6/105* (2013.01)

(58) Field of Classification Search
CPC ............ H01S 3/06733; H01S 3/06745; H01S 3/094007; G02B 6/03611; G02B 6/02038; G02B 6/03622; G02B 6/105
See application file for complete search history.

(56) References Cited

U.S. PATENT DOCUMENTS 6,324,326 B1 *  11/2001  Dejneka ............... G02B 6/1228
                                                            359/341.1
6,731,837 B2 *   5/2004  Goldberg ................ H01S 3/067
                                                            385/27

(Continued)

FOREIGN PATENT DOCUMENTS

CN        108761634 A      11/2018
CN        109752796 A       5/2019

(Continued)

OTHER PUBLICATIONS

Search Report for Russian Patent Application No. 2022129585, mailed Sep. 25, 2023 (2 pages).

(Continued)

*Primary Examiner* — Daniel Petkovsek
(74) *Attorney, Agent, or Firm* — Alston & Bird LLP

(57) ABSTRACT

Various example embodiments relate to active optical fibers and devices using active optical fibers. An active optical fiber may comprise a central part surrounded by an annular active core. The fiber may have a tapered longitudinal profile such that the fiber comprises a single-mode portion and a multimode portion. The annular core may have low birefringence, obtained for example by rotating (spinning) the fiber preform during manufacture of the fiber. Refractive index of the annular core may be higher than the refractive indices of the central part and cladding layer(s) surrounding the annular core. The active optical fiber enables selective generation or amplification of light modes with orbital angular momentum (OAM). Furthermore, the fiber has a large mode field diameter (MFD) and it is not sensitive to internal heating or environmental influences.

20 Claims, 3 Drawing Sheets

(56) References Cited

U.S. PATENT DOCUMENTS

| | | | |
|---|---|---|---|
| 7,215,858 B2* | 5/2007 | Po | G02B 6/03611 385/127 |
| 8,081,667 B2 | 12/2011 | Gapontsev et al. | |
| 9,285,541 B2* | 3/2016 | Saracco | G02B 6/14 |
| 10,429,584 B2* | 10/2019 | Muendel | G02B 6/262 |
| 2004/0258341 A1* | 12/2004 | Paolucci | G02B 6/03605 385/141 |
| 2007/0206912 A1 | 9/2007 | Minelly et al. | |
| 2009/0041064 A1 | 2/2009 | Po | |
| 2010/0247047 A1 | 9/2010 | Filippov et al. | |
| 2011/0064097 A1 | 3/2011 | Gapontsev et al. | |
| 2013/0128330 A1* | 5/2013 | Frankel | G02B 27/286 385/11 |
| 2018/0224607 A1* | 8/2018 | Bookbinder | G02B 6/421 |

FOREIGN PATENT DOCUMENTS

| | | |
|---|---|---|
| CN | 110247291 A | 9/2019 |
| CN | 110518443 A | 11/2019 |
| EP | 2478398 B1 | 4/2020 |
| FR | 3 016 742 A1 | 7/2015 |
| JP | 2000200931 A | 7/2000 |
| JP | 3132605 B2 | 2/2001 |
| JP | 2006243735 A | 9/2006 |
| JP | 2008511177 A | 4/2008 |
| JP | 2011044823 A | 3/2011 |
| JP | 2013175831 A | 9/2013 |
| JP | 5952740 B2 | 7/2016 |
| JP | 6294486 B2 | 3/2018 |
| JP | 2019519005 A | 7/2019 |
| WO | WO 2015/026327 A1 | 2/2015 |
| WO | WO 2016/061114 A1 | 4/2016 |

OTHER PUBLICATIONS

A. J. Barlow et al., "Birefringence and polarization mode-dispersion in spun single-mode fibers," Applied Optics, 20(17):2962-2968, (Sep. 1, 1981).

A. Ourmazd et al., "Thermal properties of highly birefringent optical fibers and prefroms," Applied Optics, 22(15):2374-2379, (Aug. 1, 1983).

Cailing Fu et al., "Orbital Angular Momentum Mode Converter Based on Helical Long Period Fiber Grating Inscribed by Hydrogen-Oxygen Flame," Journal of Lightwave Technology, 36(9):1683-1688, (May 1, 2018).

D. Lin et al., "106 W, picosecond Yb-doped fiber MOPA system with a radially polarized output beam," Optics Letters, 43(20):4957-4960, (Oct. 15, 2018).

D. Lin et al., "Radially and azimuthally polarized nanosecond Yb-doped fiber MOPA system incorporating temporal shaping," Optics Letters, 42(9):1740-1743, (May 1, 2017).

David N. Payne et al., "Development of Low- and High-Birefringence Optical Fibers," IEEE Journal of Quantum Electronics, 18(4):477-488, (Apr. 1982).

Di Lin et al., "Cladding-pumped ytterbium-doped fiber laser with radially polarized output," Optics Letters, 39(18):5359-5361, (Sep. 15, 2014).

H. Schneider et al., "Low-birefringence single-mode optical fibers: preparation and polarization characteristics," Applied Optics, 17(19):3035-3037, (Oct. 1, 1978).

Juho Kerttula et al., "Mode evolution in long tapered fibers with high tapering ratio," Optics Express, 20(23):25461-25470, (Nov. 5, 2012).

Miles John Padgett et al., "Orbital angular momentum exchange in cylindrical-lens mode converters," Journal of Optics B: Quantum and Semiclassical Optics, 4:S17-S19, (Jan. 2002).

Mio Koyama et al., "Nanosecond vortex laser pulses with millijoule pulse energies from a Yb-doped double-clad fiber power amplifier," Optics Express; 19(15):14420-14425, (Jul. 18, 2011).

P. Gregg et al., "Conservation of orbital angular momentum in air-core optical fibers," Optica, 2(3):267-270, (Mar. 2015).

S. R. Norman et al., "Fabrication of single-mode fibers exhibiting extremely low polarization birefringence," Electronics Letters, 15(11):309-311, (May 24, 1979).

S. Ramachandran et al., "On the scalability of ring fiber designs for OAM multiplexing," Optics Express, 23(3):3721-3730, (Feb. 9, 2015).

Scott C. Rashleigh, "Origins and Control of Polarization Effects in Single-Mode Fibers," Journal of Lightwave Technology, 1(2):312-331, (Jun. 1983).

Siddharth Ramachandran et al., "Generation and propagation of radially polarized beams in optical fibers," Optics Letters, 34(16):2525-2527, (Aug. 15, 2009).

Siddharth Ramachandran et al., "Optical vortices in fiber," Nanophotonics, 2(5-6):455-474 (2013).

T. Grosjean et al., "An all-fiber device for generating radially and other polarized light beams," Optical Communications, 203:1-5 (2002).

T. Omatsu, "Optical Vortex Fiber Lasers and their Application to Material Nano-processing," CLEO:2013 Technical Digest, Optical Society of America, 1-2, (2013).

Wending Zhang et al., "Generation of femtosecond optical vortex pulse in fiber based on an acoustically induced fiber grating," Optics Letters, 42(3):454-457, (Feb. 1, 2017).

Wending Zhang et al., "Optical vortex generation with wavelength tunability based on an acoustically-induced fiber grating," Optics Express, 24(17):19278-19285, (Aug. 22, 2016).

Xinlun Cai et al., "Integrated Compact Optical Vortex Beam Emitters," Science, 338:363-366, (Oct. 19, 2012).

Yuichi Tanaka et al., "High power picosecond vortex laser based on a large-mode-area fiber amplifier," Optics Express, 17(16):14362-14366, (Aug. 3, 2009).

International Search Report and Written Opinion for PCT/FI2020/050381 mailed Feb. 19, 2021 (11 pages).

International Preliminary Report on Patentability for PCT/FI2020/050381 mailed Sep. 9, 2022 (11 pages).

Notification of Reasons for Refusal for Japanese Patent Application No. 2022-571166, mailed Jan. 30, 2024 (8 pages).

Notification of the First Office Action for Chinese Patent Application No. 202080101679.7, mailed Nov. 8, 2024, (10 pages) (English Translation only).

Iuliia Zalesskaia et al., "Double-clad ytterbium-doped tapered fiber with circular birefringence as a gain medium for structured light," Optics Letters, 49(2):270-273, (Jan. 15, 2024).

* cited by examiner

ACTIVE OPTICAL VORTEX FIBER

CROSS-REFERENCE TO RELATED APPLICATIONS

The present application is a national phase entry of International Application No. PCT/FI2020/050381, filed Jun. 2, 2020, which is incorporated herein by reference in its entirety.

TECHNICAL FIELD

Various example embodiments generally relate to the field of active optical fibers and devices using active optical fibers. In particular, some example embodiments relate to generation and amplification of optical signals with orbital angular momentum (OAM).

BACKGROUND

Fiber laser and amplifier technology may be used in various applications. Some applications may exploit the orbital angular momentum (OAM) of an optical signal. Optical signals with OAM may be generated by various means. However, the achievable optical power and modal contrast may not be sufficient for all applications.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide a section of an active optical fiber suitable for applications using optical signals with OAM. Further implementation forms are provided in the dependent claims, the description, and the drawings.

According to a first aspect, a section of an active optical fiber may comprise a central part having a first refractive index n1, wherein a diameter of the central part changes gradually along a length of the section of the active optical fiber forming a tapered longitudinal profile; an annular core radially surrounding the central part, the annular core being doped with at least one rare-earth element and having a second refractive index n2, wherein n2>n1 and wherein a birefringence of the annular core is less than 10-5; a first cladding layer radially surrounding the annular core and a having a third refractive index n3, wherein n3<n2; and a second cladding layer radially surrounding the first cladding layer a having a fourth refractive index n4, wherein n4<n3, wherein a first portion of the section of the active optical fiber is configured to support a single-mode operation of an optical signal and a second portion of the section of the active optical fiber is configured to support a multimode operation of the optical signal.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Figure 1:
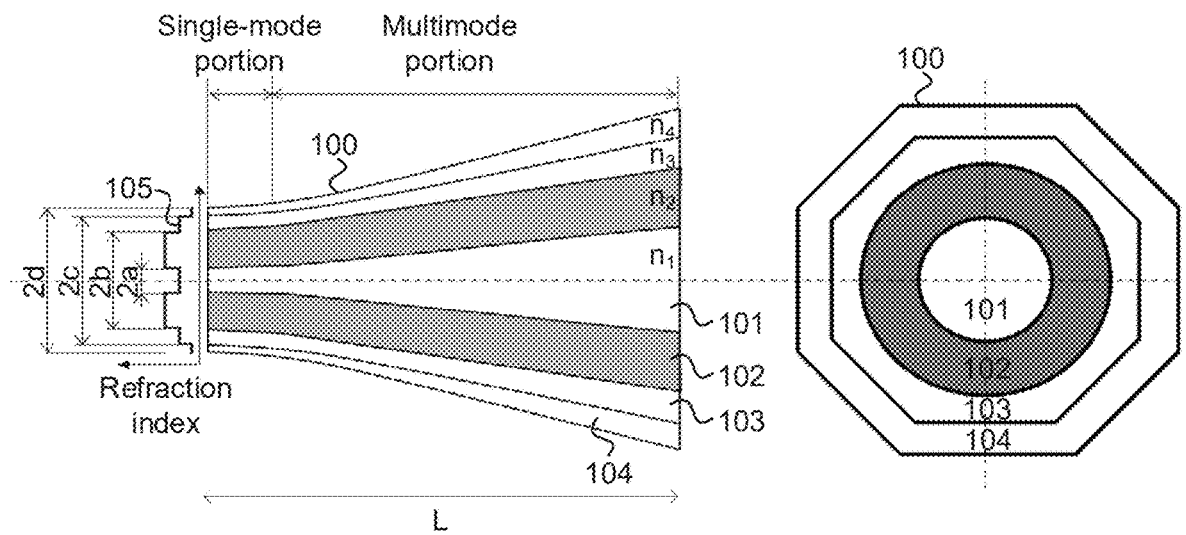
FIG. 1 illustrates an example of a section of a double-clad active tapered vortex fiber, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In general, an optical fiber may include a core surrounded by at least one cladding layer having a refractive index lower than the refractive index of the core. Refractive indices of the core and cladding material affect the critical angle for total internal reflection for light propagating in the core. This angle also defines the range of angles of incidence that enable light launched at an end of the optical fiber to propagate within the core. The core may comprise a transparent material such as for example silicon dioxide.

In active optical fibers the core may be doped with at least one rare-earth element. Rare-earth elements comprise a group of materials including cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The core of an active optical fiber may be doped with one or more of these elements, for example with Er or Yb, or a combination of Er and Yb. During operation of an active optical fiber the rare-earth ions absorb pump radiation that is launched in the active optical fiber in addition to the optical signal. This enables the optical signal to be amplified by means of stimulated emission. Different rare-earth elements may be used for different wavelengths. For example, Yb may be used for 980-1100 nm wavelength range and Er may be used for 1535-1600 nm wavelength range.

An optical fiber may be configured to support single-mode or multi-mode operation. A single-mode fiber may be configured to carry a single mode of light, which may be understood as a single ray of light propagating through the core of the optical fiber. A single-mode fiber may however comprise one or more single-mode and multi-mode sections. For example, a single-mode fiber may comprise a tapered section such that at least one thinner portion of the active core may be configured to support single-mode operation, passing only the fundamental mode, while thicker portion(s) of the active core may be configured to support multi-mode operation. However, the single-mode portion of the tapered core may cause also the thicker portion(s) to carry a single-mode optical signal.

Birefringence (B) is an optical property of a material, for example an active core of an optical fiber. A material is birefringent if it has different index of refraction for different directions. Furthermore, for example bending the optical fiber may cause refractive indices in X and Y directions to become slightly different. Birefringent materials have a refractive index that is different for different polarizations of the optical signal. Birefringence may be defined based on a maximum difference between refractive indices for different polarizations: $B=2\pi\Delta n$, where $\Delta n$ is the maximum difference between refractive indices for different polarizations (e.g. "fast" and "slow" modes).

Light beams with orbital angular momentum (OAM) may be exploited in various applications such as for example optical communications, optical tweezers, manipulation of atoms, and material processing. Light beams with OAM may be generated for example by volume optics, such as cylindrical-lens mode converters, spatial light modulators, or integrated silicon devices. Furthermore, OAM beams may be directly generated in a single-mode optical fiber, for example based on long-period fiber gratings, and in a low-mode optical fiber (2-4 modes) through controlled mode coupling. However, the optical power of light beams obtained by such methods may be quite modest, for example in the order of a few mW.

To get more powerful optical beams with OAM, master oscillator-power amplifier (MOPA) systems with large mode area (LMA) active optical fibers with sufficiently large mode spot size (e.g. 25 μm) may be used. Such systems may apply selective excitation of desired OAM modes with simultaneous appropriate bending of the active fiber. Another approach may comprise using a MOPA system containing bulk OAM converters, for example S-plate(s) or Q-plate(s), in combination with fiber amplification stages. Such approaches may however result in a limited size of the mode field diameter at the active fiber, which may also limit the achievable optical power. Furthermore, a low-mode fiber that does not maintain polarization in the last gain cascade may need to be used. Existence of intrinsic residual random birefringence in such fibers may lead to deterioration of the mode contrast, partial depolarization of an output beam, and finally degradation of the OAM beam quality. Mode contrast may refer to a power distribution between different modes, for example modes with OAM and modes without OAM.

Furthermore, using low-aperture active few-mode LMA fibers may result in similar gain for all supported fiber modes, for example for donut-shaped modes (owing by OAM) as well as other modes. Therefore, such systems may not provide selectivity in mode amplification. This may lead not only to the creation of the desired beam with OAM but also to the transfer of pump radiation power to the other (undesired) modes. This may finally lead to a deterioration of the contrast of the mode content.

Therefore, example embodiments of the present disclosure may be used to increase the achievable average and peak power of a light mode with OAM, improving the modal contrast by reducing weight of undesirable light modes without OAM, and improving stability of the generated light beam with OAM to environmental influences.

According to an example embodiment, an active optical fiber may comprise a central part surrounded by an annular (ring-shaped) active core. The fiber may have a tapered longitudinal profile such that the fiber comprises a single-mode portion and a multimode portion. The annular core may have low birefringence, obtained for example by rotating (spinning) the fiber preform during manufacture of the fiber. Refractive index of the annular core may be higher than the refractive indices of the central part and cladding layer(s) surrounding the annular core. The active optical fiber enables selective generation or amplification of light modes with OAM. Furthermore, the fiber has a large mode field diameter (MFD) and it is not sensitive to internal heating due to pump or environmental influences. The active optical fiber may be applied in various apparatuses such as for example lasers or master-oscillator power amplifiers (MOPA).

FIG. 1 illustrates an example of a section of a double-clad active tapered vortex fiber, according to an example embodiment. FIG. 1 illustrates both a longitudinal cross-section (left) and a radial cross-section (right) of the section of the active optical fiber 100. The section of the active optical fiber 100 may comprise a central part 101. The central part 101 may have a first refractive index $n_1$. The central part 101 may be radially symmetric or radially substantially symmetric. The central part 101 may comprise any suitable material such as for example silicon dioxide. Even though the central part 101 has been illustrated as a uniform part, it is appreciated that the central part 101 may be internally structured to one or more sub-parts. A diameter of the central part 101 may change gradually along a length (L) of the section of the active optical fiber 100, thereby forming a tapered longitudinal profile. For example, as illustrated in FIG. 1, the diameter of the central part 101 may increase along the length of the section of the active optical fiber 100 from the left to the right. The tapered longitudinal profile may comprise a linear profile or a parabolic convex profile, which are beneficial for amplification of modes with OAM since they improve pump absorption.

The section of the active optical fiber 100 may further comprise an annular core 102. The annular core 102 may be radially surrounding the central part 101. The annular core 102 may therefore have a ring-shaped cross-section, as illustrated in the radial cross-section of FIG. 1. The annular core 102 may have a second refractive index $n_2$. The refractive index of the annular core may be higher than the refractive index of the central part 101, $n_2>n_1$, as illustrated in the refractive index profile 105.

The annular core 102 may further comprise at least one rare-earth element. Hence, the annular core 102 may be active. The annular core 102 may be doped with the rare-earth element(s), for example to enable amplification of an optical signal launched in the annular core 102 when pump radiation is launched in the section of the active optical fiber 100. Birefringence of the annular core 102 may be less than $10^{-5}$. For example, difference between the refractive indices $n_{slow}$ and $n_{fast}$ of the slow and fast polarization modes may be smaller than $10^{-5}$, that is, $B=n_{slow}-n_{fast}<10^{-5}$. The annular core 102 may comprise any suitable material such as for example silicon dioxide. A thickness of the annular core 102 may change, for example increase, gradually along the tapered longitudinal profile. For example, the thickness of the annular core 102 may be proportional to the diameter of the central part 101 along the length of the fiber section. Increasing the thickness of the annular core 102 may be beneficial, because it means larger mode area, resulting in high threshold for non-linear effects and large storage energy, for example high peak or average power.

The section of the active optical fiber 100 may further comprise a first cladding layer 103. The first cladding layer 103 may have a third refractive index, $n_3$. The refractive index of the first cladding layer may be lower than the refractive index of the annular core 101, $n_3<n_2$, as illustrated in the refractive index profile 105. The first cladding layer 103 may be radially surrounding the annular core 102, for example as illustrated in the radial-cross section of FIG. 1.

The section of the active optical fiber 100 may further comprise a second cladding layer 104. The second cladding layer 104 may have a fourth refractive index, $n_4$. The refractive index of the second cladding layer may be lower than the refractive index of the first cladding layer 103, $n_4<n_3$, as illustrated in the refractive index profile 105. The second cladding layer 104 may be radially surrounding the first cladding layer 103, for example as illustrated in the radial-cross section of FIG. 1. The first and second cladding layers may comprise any suitable materials such as for example silicon dioxide. The thicknesses of the first cladding layer 103 and the second cladding layer may change, for example increase, gradually along the tapered longitudinal profile. For example, the thickness of the first cladding layer 103 and/or the second cladding layer 104 may be proportional to the diameter of the central part 101. Similar to the annular core 102, increasing the thickness of the first cladding layer 103 and the second cladding layer 104 may be beneficial.

The section of the active optical fiber 100 may comprise a first portion configured to support a single-mode (SM) operation. The first portion may be located at a first end of the section of the active optical fiber 100. The first end may comprise a narrow end of the fiber section. At the narrow end of the fiber section, the central part 101 may have a radius a, as illustrated in FIG. 1. The annular core 102 may have an inner radius a and an outer radius b. The first cladding layer 103 may have an inner radius b and an outer radius c. The second cladding layer 104 may have an inner radius c and an outer radius d.

The annular core 102 may be configured to receive an optical signal, for example at the first portion of the fiber section. In other words, the optical signal may be launched at the annular core 102 at the narrow end of the section of the active optical fiber 100.

The first portion of the section of the active optical fiber 100 may be configured to satisfy the following conditions: $2a<\lambda_s$ and $2\pi b NA/\lambda_s<2.405$, where a is the inner radius of the annular core 102, b is an outer radius of the annular core 102, $\lambda_s$ is a wavelength of the optical signal, and NA is a numerical aperture of the annular core. The numerical aperture NA may be defined based on a square root of a subtraction of squared second and third refractive indices, for example by $NA=\sqrt{(n_2^2-n_3^2)}$. Fulfillment of the above conditions enables propagation of the fundamental mode in the first portion of the section of the active optical fiber 100. Length of the first portion (SM) may be determined based on simultaneous fulfillment of the two conditions. Length of the first portion may be for example 0.1 to 1 m. The length of the first portion may depend on the longitudinal shape of the tapered fiber.

The section of the active optical fiber 100 may further comprise a second portion configured to support multimode (MM) operation. At the second portion the above two conditions may not be satisfied, causing the second portion not to be limited to single-mode operation and allowing several modes to propagate in the annular core 102. The second portion may comprise a wide end of the section of active optical fiber 100. At the wide end of the fiber the diameter of the central part 101, the thickness of the annular core 102, the thickness of the first cladding layer 103, and/or the thickness of the second cladding layer 104 may be higher than the corresponding measures at the narrow end.

The first cladding layer 103 may be configured to receive pump radiation at the first portion, e.g. the narrow end, of the section of the active optical fiber 100. Furthermore, the second portion, e.g. the wide end, of the section of the active optical fiber 100 may be configured to receive pump radiation. The pump radiation may be therefore launched at the first cladding layer 103 at one or both ends of the first cladding layer 103. According to an example embodiment, the power of pump radiation launched at the second portion may be higher than the power of pump radiation launched at the first portion. A wavelength of the pump radiation $\lambda_p$ must be shorter than the wavelength of the optical signal, $\lambda_s$. The section of the active optical fiber 100 may be used in various applications as such, or, in combination with other similar or other type of fiber section(s).

Figure 2:
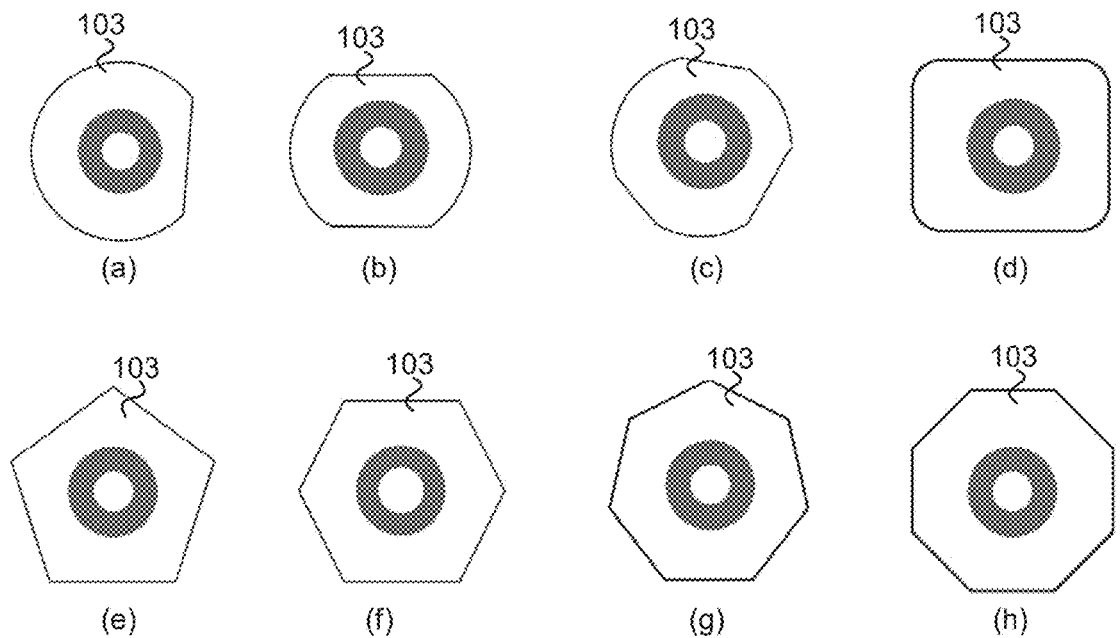
FIG. 2 illustrates examples of truncation of a first cladding layer of a double-clad active tapered vortex fiber, according to an example embodiment.

FIG. 2 illustrates examples of truncation of a first cladding layer of a double-clad active tapered vortex fiber, according to an example embodiment. Truncation of the first cladding layer 103 may be applied to improve absorption of the pump radiation. The first cladding layer 103 may be truncated for example 1, 2, 3, 4, 5, 6, 7, or 8 times to form different radial cross-sections as illustrated in FIG. 2a-h. For example, one truncation may result in a D-shaped radial cross-section (FIG. 2a). Five truncations may result in a pentagonal radial cross-section (FIG. 2e) and eight truncations may result in an octagonal radial cross-section (FIG. 2h). Truncation enables more pump radiation to cross the annular core 102, thereby improving amplification of an optical signal propagating in the annular core 102.

Figure 3:
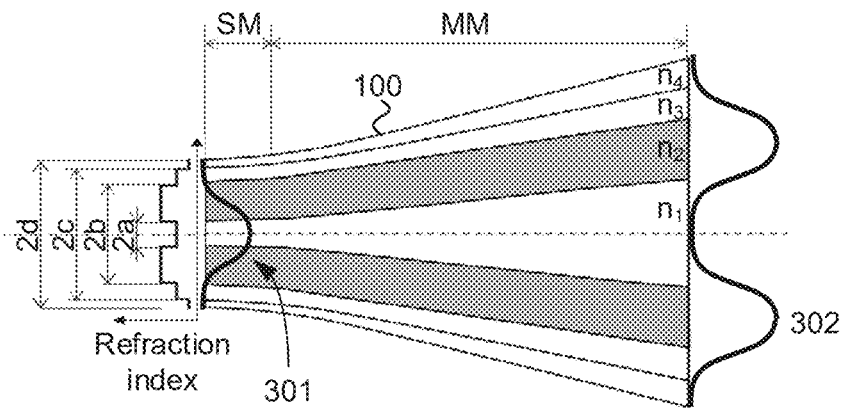
FIG. 3 illustrates an example of a field distribution of an optical signal propagating in a section of double-clad active tapered vortex fiber, according to an example embodiment.

FIG. 3 illustrates an example of a field distribution of an optical signal propagating in a section of double-clad active tapered vortex fiber, according to an example embodiment. It has been experimentally demonstrated that when the conditions for single-mode operation are fulfilled at the first portion, a fundamental mode with a Gaussian field distribution 301 ($M^2\sim1$) propagates in the first portion (single-mode portion) of the annular core 102 having the outer diameter of 2b. In the second portion (multimode portion), the conditions are no longer fulfilled and several modes can be supported in the annular core 102. In absence of strong mechanical disturbances that provoke mode coupling, a fundamental mode may propagate in the annular core 102 also at the second portion ($M^2\sim1$). The mode field may have a ring shape 302 in the near field zone at the wide end of the fiber section and the Gaussian shape 301 in the far field at the narrow end of the fiber section. For example, for a passive tapered fiber with a 120 µm ring-shaped core, a diffraction-limited beam with sufficient quality ($M^2\sim1.2$) has been experimentally obtained.

The low birefringence of the annular core 102 ($B<10^{-5}$) enables to reduce polarization state distortion during propagation and amplification of an optical signal in the section of the active tapered fiber 100. According to an example embodiment, manufacturing the section of the active optical fiber 100 may comprise rotating a fiber preform during pulling of the section of the active optical fiber 100. Rotation may be applied to obtain a spun fiber. The preform may be rotated for example with an angular speed in the range of 300-1000 rpm. The resulting fiber pitch may be in the range of 2-15 mm at the wide part (second portion) of the tapered fiber section. Pitch of a fiber may refer to a period of rotation, e.g. length over which the spun fiber rotates 360°.

The intrinsic residual birefringence in an optical fiber is determined mainly by geometric defects of its core, for example ellipticity, frozen mechanical stresses, or local fiber bends. The local eigenstate of such birefringence is in general a linear polarization. When the fiber preform is rotated during drawing, the geometrical anisotropy axes change their angular position many times and each polarization component spends approximately equal time propagating as a fast and a slow wave. As a result, the intrinsic birefringence of such spun fiber may be very small ($B<10^{-5}$). The intrinsic polarization eigenstate may be close to circular polarization. As a result, the polarization of light propagating through such fiber may be perturbed only very slightly. Thus, such a fiber may not gain any polarization preferably and accordingly, distortion of the polarization during amplification reduces. This is beneficial for amplification of the waves with OAM.

Low birefringence may be alternatively obtained by other means. One way to obtain low intrinsic birefringence is to make the optical fiber as close to ideal as possible, for example, by making the fiber substantially symmetrical with a low level of internal stresses. Another way for obtaining low intrinsic birefringence is to apply compensated fibers. A low level of internal birefringence can be achieved for example by selecting the fiber dopant materials such that a stress birefringence ($B_s$) together with a geometrical shape birefringence ($B_c$) add to zero.

One solution for amplification and generation of OAM beams is to use step index refraction LMA active fibers. For example, PANDA (polarization-maintaining and absorption reducing) type LMA fibers with 25 μm core may be applied. However, such approach may not be optimal for beam formation. For example, fast and slow waves of a highly birefringent PANDA fiber may differ greatly in the propagation constant and for the formation of a donut-shaped OAM beam, the active fiber may need to be bent in an unpredictable way. Highly birefringent LMA fibers may be also strongly temperature sensitive. When the pump radiation is absorbed, such optical fibers may heat up resulting in a change in the polarization state at the fiber output.

Therefore, another solution is to use a regular isotropic active LMA fiber to amplify a beam with OAM. This may simplify the formation of the OAM mode. However, when using an isotropic active fiber, radiation depolarization may arise as a result of the presence of random birefringence, which, in turn, may be caused by fiber bends. A drawback of both strongly birefringent and regular LMA fibers with a step profile may be that the integral of overlapping the profile of the refractive index (distribution of dopants) is approximately the same for all supported modes. Accordingly, amplification of an optical signal is not optimal with respect to modal contrast, because the undesirable modes existing in a low-mode fiber will also experience amplification. This may limit the power of the OAM beam. This may also deteriorate the quality of the OAM beam. Example embodiments of the present disclosure therefore provide an active tapered fiber with an annular core, which has significant amplification only for donut-shaped modes, e.g., modes with OAM. The disclosed section of an active optical fiber may be called a SPUN ring-core tapered double clad fiber (SPUN rcT-DCF).

The example embodiments of the present disclosure provide at least the following benefits:

1) Due to the ring-shaped doped core, the SPUN rcT-DCF has spatially selective amplification for donut shaped modes. SPUN rcT-DCF effectively gains only modes with a substantial overlap integral, i.e., the ring-shaped modes. This provides a good modal contrast and thereby enables excitation and amplification exclusively or primarily for OAM beams. Practically no gain may be provided for modes that have a maximum field in the central part 101 and therefore for example excessive amplification of the fundamental mode may be avoided.

2) The SPUN rcT-DCF has a large mode field diameter (MFD), for example at least 120 μm in the wide part while maintaining high brightness (near diffracted limited beam quality) of the amplified light. This enables to achieve high average and peak power.

3) The SPUN rcT-DCF has a low intrinsic birefringence ($<10^{-5}$), and as a result, it causes practically no disturbation to the polarization state of amplified light. Therefore, amplification and propagation of OAM beams occurs with minimal distortion. Because of the low birefringence, the SPUN rcT-DCF is also not sensitive to heating due to pump absorption. Furthermore, the SPUN rcT-DCF is not sensitive to environmental influences such as vibration and temperature changes.

Even though not illustrated in FIG. 1, the section of the active optical fiber 100 may further comprise additional structures such as for example one or more coating layers radially surrounding the cladding layer(s). The coating layer(s) may for example comprise polymer coating. The coating layer(s) may be configured to reduce environmental influences that may cause external birefringence to be introduced at the annular core 102 having a low intrinsic birefringence. Therefore, the low internal birefringence coupled with one or more coating layers together provide an active optical vortex fiber that provides stable but selective propagation and amplification for modes with OAM under changing (internal/external) temperature and other environmental influences such as mechanical bending. In the above example embodiments, the pump radiation may be configured to propagate in the first cladding layer 103 in a same or substantially same direction as the optical signal and/or in opposite or substantially opposite direction to the optical signal.

Figure 4:
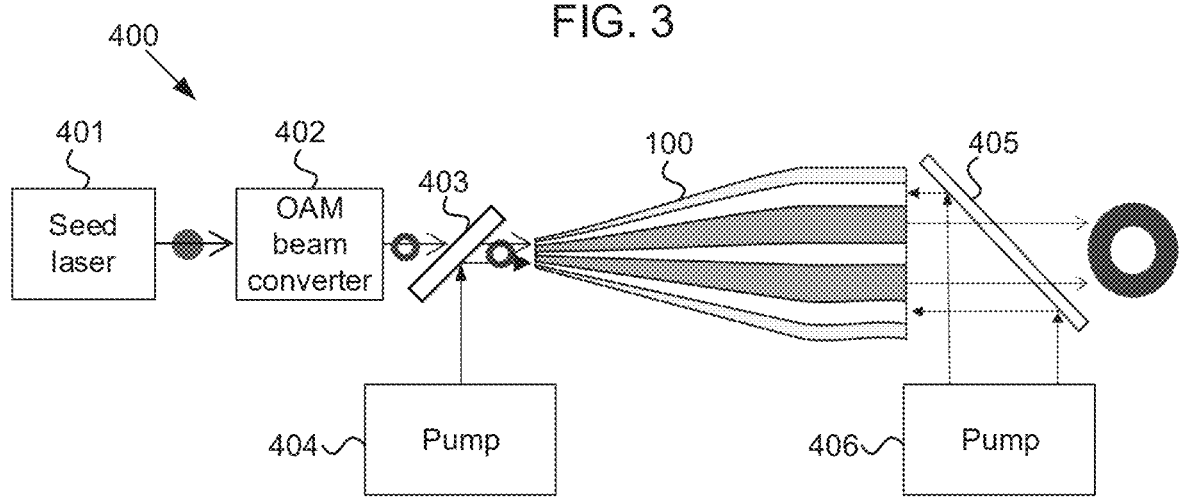
FIG. 4 illustrates an example of a master oscillator power amplifier (MOPA) comprising a double-clad active vortex fiber, according to an example embodiment.

FIG. 4 illustrates an example of a master oscillator power amplifier (MOPA) comprising a double-clad active vortex fiber, according to an example embodiment. The MOPA 400 may comprise an optical source 401, such as for example seed laser (master oscillator), configured to generate an optical signal, for example a seed laser beam. The optical signal may have a wavelength $\lambda_s$. The MOPA 400 may further comprise an optical converter 402 configured to produce or introduce an orbital angular momentum to the optical signal. The optical (beam) converter 402 may comprise a free space bulk optical scheme to form a beam with OAM based on the seed laser beam. The optical converter 402 may for example comprise an S-plate or a Q-plate. The MOPA 400 may also comprise the section of the active optical fiber 100.

The MOPA 400 may further comprise a first dichroic mirror 403. The first dichroic mirror 403 may be configured to couple a first portion of pump radiation from a first pump radiation source 404 to the first portion of the section of the active optical fiber 100, for example at the first cladding layer 103 at the narrow end of the fiber section. The first dichroic mirror 403 may be also configured to couple the optical signal from the optical converter 402 to the first portion of the section of the active optical fiber 100, for example at the annular core 102 at the narrow end of the fiber section.

The MOPA 400 may further comprise a second dichroic mirror 405. The second dichroic mirror 405 may be configured to couple a second portion of pump radiation from a second pump radiation source 406 to the second portion of the active optical fiber, for example at the first cladding layer 103 at the wide end of the fiber section. The second dichroic mirror 405 may be further configured to provide an output optical signal from the second portion of the section of the active optical fiber. The second dichroic mirror 405 may be for example configured to convey the optical signal received from the annular core 102 at the wide end of the fiber 100 to an output of the MOPA 400. The output optical signal may comprise an amplified version of the optical signal, where the OAM modes have been selectively amplified. The MOPA 400 may comprise at least one of the pump radiation sources 404, 406. Alternatively, the MOPA 400 may be configured to be coupled to external pump radiation source(s). Therefore, the MOPA 400 may not include the pump radiation sources 404, 406.

Figure 5:
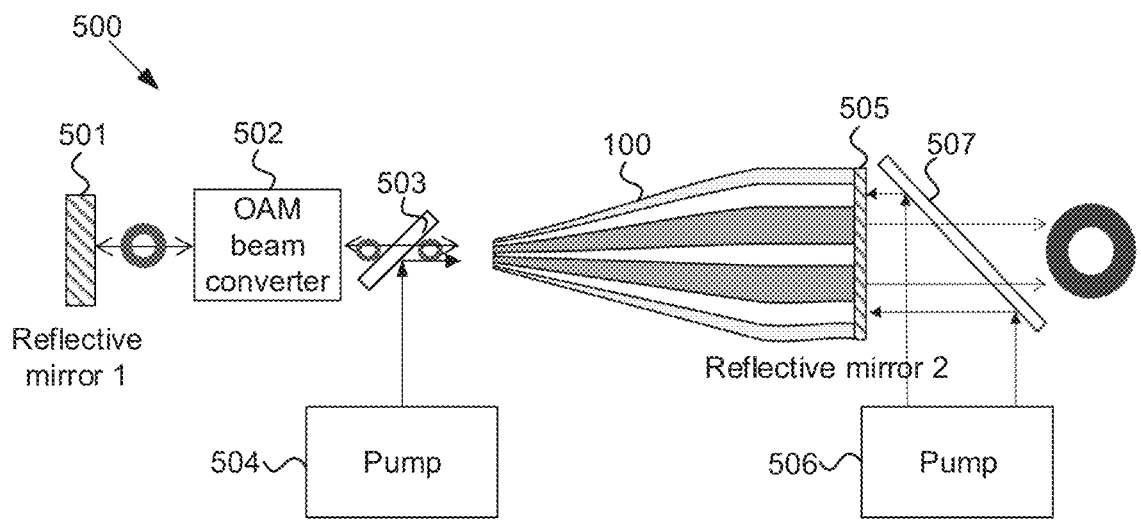
FIG. 5 illustrates an example of a laser comprising a double-clad active vortex fiber, according to an example embodiment.

FIG. 5 illustrates an example of a laser comprising a double-clad active vortex fiber, according to an example embodiment. The laser 500 may be configured to generate OAM beams within a cavity formed at least by two mirrors and a SPUN rcT-DCF. The laser 500 may comprise a first mirror 501. The first mirror 501 may be highly reflective, for example substantially 100% reflective. The first mirror 501 may be optically connected to optical converter 502, which may be similar to optical converter 402. The first mirror 501 may be configured to reflect the optical signal. For example, the first mirror 501 may be configured to reflect the optical signal received from the optical converter 502 back to the optical converter 502. The optical signal may have a wavelength $\lambda_s$. The laser 500 may also comprise the section of the active optical fiber 100.

The laser 500 may further comprise a second mirror 505. The second mirror 505 may be optically connected and/or physically coupled to the second portion of the section of the active optical fiber 100, for example to the wide end of the fiber section. For example, the second mirror 505 can be deposited at the wide endface of the SPUN rcT-DCF. The second mirror 505 may be partially transparent such that part of the optical signal exiting the annular core 102 of the fiber section may pass through the second mirror 505. The second mirror 505 may be therefore configured to partially reflect the optical signal. Reflectivity of the first mirror 501 may be therefore higher than the reflectivity of the second mirror 505.

The laser 500 may further comprise a first dichroic mirror 503. The first dichroic mirror 503 may be configured to couple a first portion of the pump radiation from a first pump radiation source 504 to the first portion of the section of the active optical fiber 100, for example at the first cladding layer 103 at the narrow end of the fiber section. The first dichroic mirror 503 may be also configured to couple the optical signal from the optical converter 502 to the first portion of the section of the active optical fiber 100, for example at the annular core 102 at the narrow end of the fiber section. Furthermore, the first dichroic mirror 503 may be configured to couple the optical signal from the first portion of the section of the active optical fiber 100, for example from the annular core 102 at the narrow end of the fiber section, to the optical converter 502. the The laser 500 may further comprise a second dichroic mirror 507. The second dichroic mirror 507 may be configured to couple a second portion of pump radiation from a second pump radiation source 506 to the second portion of the section of the active optical fiber 100, for example at the first cladding layer 103 at the wide end of the fiber section. The second dichroic mirror 507 may be further configured to provide an output optical signal from the second portion of the section of the active optical fiber through the second mirror 505. The second dichroic mirror 507 may be for example configured to convey the optical signal exiting the annular core 102 and propagating through the second mirror 505 at the wide end of the fiber 100 to an output of the laser 500. The laser 500 enables to generate a laser beam with high power for OAM modes.

Figure 6:
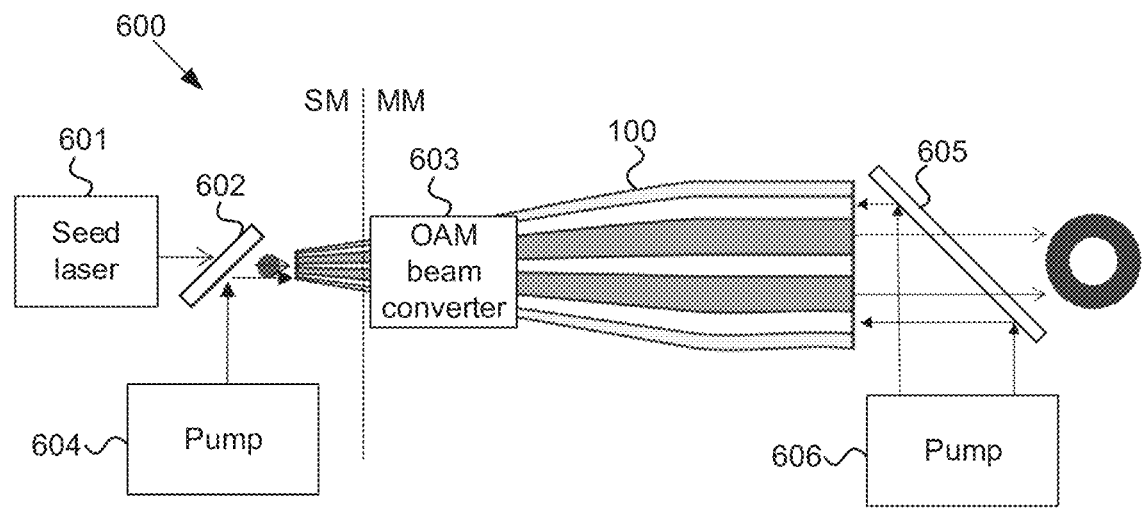
FIG. 6 illustrates another example of a master oscillator power amplifier (MOPA) comprising a double-clad active vortex fiber, according to an example embodiment.

FIG. 6 illustrates another example of a master oscillator power amplifier (MOPA) comprising a double-clad active vortex fiber, according to an example embodiment. The MOPA 600 may be similar to MOPA 400. However, the OAM converter 603 may be in this example embodiment integrated within the section of the active optical fiber 100.

The MOPA 600 may comprise an optical source 601 similar to the optical source 401, for example a seed laser. The MOPA 600 may further comprise a first dichroic mirror 602 configured to couple a first portion of pump radiation from a first one pump radiation source 604 to the first portion of the section of the active optical fiber 100, for example to the first cladding layer 103 at the narrow end of the fiber section. The first dichroic mirror 602 may be further configured to couple the optical signal from the optical source 601 to the first portion of the section of the active optical fiber 100, for example to the annular core 102 at the narrow end of the fiber section. Similar to MOPA 400, the pump radiation sources 604, 606 may be internal or external to the MOPA 600.

The optical converter 603 may comprise an all-fiber device such as for example a mechanical device for controlled mode coupling, a device for providing controlled bending of the fiber, or an acousto-optical device. The optical converter 603 may be integrated within the second (multimode) portion of the section of the active optical fiber 100. The optical converter 603 may be located in proximity of the first (single-mode) portion of the section of the optical fiber 100. Similar to optical converter 402, the optical converter 603 may be configured to produce an orbital angular momentum (OAM) to the optical signal. The optical converter 603 may be located at the beginning of the multimode portion, where the fiber already meets the two conditions, $2a<\lambda_s$ and $2\pi bNA/\Delta_s<2.405$, and therefore supports several modes that can form a mode with OAM.

The MOPA 600 may further comprise a second dichroic mirror 605. The second dichroic mirror 605 may be configured to couple a second portion of the pump radiation from a second pump radiation source 606 to the second portion of the section of the active optical fiber 100. The second dichroic mirror 605 may be further configured to provide an output optical signal from the second portion of the section of the active optical fiber, similar to dichroic mirror 405. The MOPA 600 enables generation of powerful OAM beams without an external optical converter between the optical source 601 and the section of the active optical fiber 100.

Figure 7:
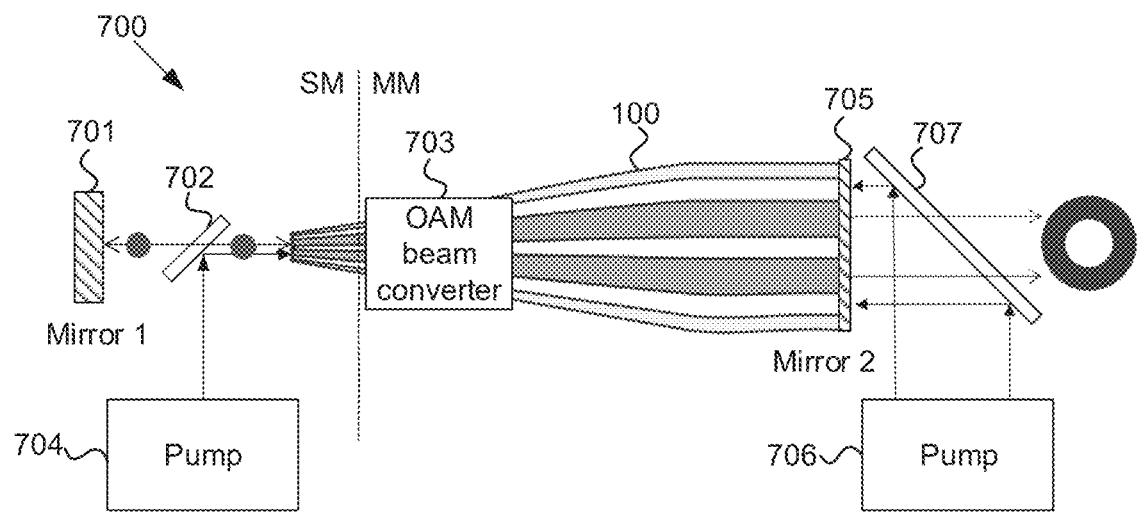
FIG. 7 illustrates another example of a laser comprising a double-clad active vortex fiber, according to an example embodiment.

FIG. 7 illustrates another example of a laser comprising a double-clad active vortex fiber, according to an example embodiment. The laser 700 may be similar to laser 500. However, the OAM converter 703 may be in this example embodiment integrated within the section of the active optical fiber 100.

The laser 700 may comprise a first mirror 701, similar to mirror 501. The first mirror 701 may be optically connected to the first portion of the section of the active optical fiber 100 and configured to reflect the optical signal, similar to mirror 501. The laser 700 may further comprise a second mirror 705, similar to mirror 505. Reflectivity of the first mirror 701 may be higher than reflectivity of the second mirror 705. The second mirror 707 may be optically connected to the second portion of the section of the active optical fiber 100 and configured to reflect the optical signal, similar to mirror 505.

The laser 700 may further comprise a first dichroic mirror 702 configured to couple a first portion of pump radiation from a first pump radiation source 704 to the first portion of the section of the active optical fiber 100, for example to the first cladding layer 103 at the narrow end of the fiber section. The first dichroic mirror 702 may be further configured to couple an optical signal from the first portion of the section of the active optical fiber 100 to the first mirror 701 and a reflected optical signal from the first mirror 701 to the first portion of the section of the active optical fiber. The first dichroic mirror 702 may be configured to receive the optical signal from the annular core 102 of the fiber section. The first dichroic mirror 702 may be configured to couple the reflected optical signal to the annular core 102 of the fiber section.

The laser 700 may further comprise optical converter 703 similar to optical converter 603 and integrated in the section of the active optical fiber 100 in a similar fashion. The laser 700 may further comprise a second dichroic mirror 707, which may be similar and have similar functionality as dichroic mirror 507. For example, the dichroic mirror 507 may be configured to couple pump radiation from a second pump radiation source 706 to the section of the active optical fiber 100 and to provide an output from the laser 700. The laser 700 enables to generate a laser beam with high power for OAM modes without an external optical converter between the first mirror 701 and the section of the active optical fiber 100.

Example embodiments disclosed herein provide an active optical fiber and apparatuses suitable for generation and amplification of OAM modes of an optical signal.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the blocks or elements identified, but that such blocks or elements do not comprise an exclusive list. An apparatus may therefore contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
a section of an active optical fiber, comprising:
a central part having a first refractive index $n_1$, wherein a diameter of the central part changes gradually along a length of the section of the active optical fiber forming a tapered longitudinal profile;
an annular core radially surrounding the central part, the annular core being doped with at least one rare-earth element and having a second refractive index $n_2$, wherein $n_2 > n_1$ and wherein a birefringence of the annular core is less than $10^{-5}$;
a first cladding layer radially surrounding the annular core and having a third refractive index $n_3$, wherein $n_3 < n_2$; and
a second cladding layer radially surrounding the first cladding layer and having a fourth refractive index $n_4$, wherein $n_4 < n_3$, wherein a first portion of the section of the active optical fiber is configured to support a single-mode operation of an optical signal and a second portion of the section of the active optical fiber is configured to support a multimode operation of the optical signal, wherein the section of the active optical fiber comprises a spun active optical fiber, and
the apparatus further comprising: a dichroic mirror for providing an output optical signal from the annular core of the second portion of the section of active optical fiber to an output of the apparatus.

2. The apparatus according to claim 1, wherein the first portion of the section of the active optical fiber is configured to satisfy the following conditions:

$$2a < \lambda_s, \text{ and}$$

$$2\pi b NA/\lambda_s < 2.405,$$

wherein a is an inner radius of the annular core, b is an outer radius of the annular core, $\lambda_s$ is a wavelength of the optical signal, and NA is a numerical aperture of the annular core, wherein $NA = \sqrt{n_2^2 - n_3^2}$.

3. The apparatus according to claim 1, wherein thickness of at least one of the annular core, the first cladding layer, or the second cladding layer changes gradually along the tapered longitudinal profile.

4. The apparatus according to claim 1, wherein the tapered longitudinal profile comprises a parabolic convex profile.

5. The apparatus according to claim 1, wherein the central part is radially substantially symmetric.

6. The apparatus according to claim 1, obtainable by rotating a fiber preform during pulling of the section of the active optical fiber.

7. The apparatus according to claim 6, wherein a pitch of the section of the active optical fiber is in a range of 2-15 mm at the second portion of the section of the active optical fiber.

8. The apparatus according to claim 6, wherein an angular speed of rotation during pulling of the section of the active optical fiber is in the range of 300-1000 rpm.

9. The apparatus according to claim 1, wherein the annular core is configured to receive the optical signal at the first portion of the section of the active optical fiber.

10. The apparatus according to claim 1, wherein the first cladding layer is configured to receive pump radiation at the first portion of the section of the active optical fiber and/or the second portion of the section of the active optical fiber.

11. The apparatus according to claim 10, wherein a wavelength of the pump radiation $\lambda_p$ is shorter than the wavelength of the optical signal $\lambda_s$.

12. The apparatus according to claim 11, wherein the dichroic mirror is a second dichroic mirror and the apparatus further comprises:
an optical source configured to generate the optical signal;
an optical converter configured to produce the optical signal with an orbital angular momentum; and
a first dichroic mirror configured to couple a first portion of the pump radiation from a first pump radiation source and the optical signal from the optical converter to the first portion of the section of the active optical fiber, wherein the second dichroic mirror is configured to couple a second portion of the pump radiation from a second pump radiation source to the second portion of the active optical fiber and to provide an output optical signal from the second portion of the section of the active optical fiber.

13. The apparatus according to claim 11, wherein the dichroic mirror is a second dichroic mirror and the apparatus further comprises:
a first mirror configured to reflect the optical signal, wherein the first mirror is optically connected to an optical converter configured to produce the optical signal with an orbital angular momentum;
a second mirror optically connected to the second portion of the section of the active optical fiber, wherein a reflectivity of the first mirror is higher than a reflectivity of the second mirror; and
a first dichroic mirror configured to couple a first portion of the pump radiation from a first pump radiation source and the optical signal from the optical converter to the first portion of the section of the active optical fiber, wherein the second dichroic mirror is configured to couple a second portion of the pump radiation from a second pump radiation source to the second portion of the active optical fiber and to provide an output optical signal from the second portion of the section of the active optical fiber through the second mirror.

14. The apparatus according to claim 11, wherein the dichroic mirror is a second dichroic mirror and the apparatus further comprises:
an optical source configured to generate the optical signal;
a first dichroic mirror configured to couple a first portion of the pump radiation from a first one pump radiation source and the optical signal from the optical source to the first portion of the section of the active optical fiber; and
an optical converter integrated within the second portion of the section of the active optical fiber in proximity of the first portion of the section of the optical fiber, wherein the optical converter is configured to produce an orbital angular momentum (OAM) to the optical signal,
wherein the second dichroic mirror is configured to couple a second portion of the pump radiation from a second pump radiation source to the second portion of the active optical fiber and to provide an output optical signal from the second portion of the section of the active optical fiber.

15. The apparatus according to claim 10, wherein the dichroic mirror is a second dichroic mirror and the apparatus further comprises:
an optical source configured to generate the optical signal;
an optical converter configured to produce the optical signal with an orbital angular momentum; and
a first dichroic mirror configured to couple a first portion of the pump radiation from a first pump radiation source and the optical signal from the optical converter to the first portion of the section of the active optical fiber, wherein the second dichroic mirror is configured to couple a second portion of the pump radiation from a second pump radiation source to the second portion of the active optical fiber and to provide an output optical signal from the second portion of the section of the active optical fiber.

16. The apparatus according to claim 15, wherein the optical converter comprises an S-plate or a Q-plate.

17. The apparatus according to claim 10, wherein the dichroic mirror is a second dichroic mirror and the apparatus further comprises:
a first mirror configured to reflect the optical signal, wherein the first mirror is optically connected to an optical converter configured to produce the optical signal with an orbital angular momentum;
a second mirror optically connected to the second portion of the section of the active optical fiber, wherein a reflectivity of the first mirror is higher than a reflectivity of the second mirror; and
a first dichroic mirror configured to couple a first portion of the pump radiation from a first pump radiation source and the optical signal from the optical converter to the first portion of the section of the active optical fiber, wherein the second dichroic mirror is configured to couple a second portion of the pump radiation from a second pump radiation source to the second portion of the active optical fiber and to provide an output optical signal from the second portion of the section of the active optical fiber through the second mirror.

18. The apparatus according to claim 10, wherein the dichroic mirror is a second dichroic mirror and the apparatus further comprises:
an optical source configured to generate the optical signal;
a first dichroic mirror configured to couple a first portion of the pump radiation from a first one pump radiation source and the optical signal from the optical source to the first portion of the section of the active optical fiber; and
an optical converter integrated within the second portion of the section of the active optical fiber in proximity of the first portion of the section of the optical fiber, wherein the optical converter is configured to produce an orbital angular momentum (OAM) to the optical signal,
wherein the second dichroic mirror is configured to couple a second portion of the pump radiation from a second pump radiation source to the second portion of the active optical fiber and to provide an output optical signal from the second portion of the section of the active optical fiber.

19. An apparatus according to claim 10, wherein the dichroic mirror is a second dichroic mirror and the apparatus further comprises:
a first mirror optically connected to the first portion of the section of the active optical fiber and configured to reflect the optical signal;
a second mirror optically connected to the second portion of the section of the active optical fiber and configured to reflect the optical signal, wherein a reflectivity of the first mirror is higher than a reflectivity of the second mirror;
a first dichroic mirror configured to couple a first portion of the pump radiation from a first pump radiation source to the first portion of the section of the active optical fiber; and
an optical converter integrated within the second portion of the section of the active optical fiber in proximity of the first portion of the section of the optical fiber, wherein the optical converter is configured to produce an orbital angular momentum (OAM) to the optical signal,
wherein the second dichroic mirror is configured to couple a second portion of the pump radiation from a second pump radiation source to the second portion of the active optical fiber and to provide an output optical signal from the second portion of the section of the active optical fiber through the second mirror.

20. An apparatus according to claim 10, wherein the dichroic mirror is a second dichroic mirror and the apparatus further comprises:
a first mirror optically connected to the first portion of the section of the active optical fiber and configured to reflect the optical signal;
a second mirror optically connected to the second portion of the section of the active optical fiber and configured to reflect the optical signal, wherein a reflectivity of the first mirror is higher than a reflectivity of the second mirror;
a first dichroic mirror configured to couple a first portion of the pump radiation from a first pump radiation source to the first portion of the section of the active optical fiber; and
an optical converter integrated within the second portion of the section of the active optical fiber in proximity of the first portion of the section of the optical fiber, wherein the optical converter is configured to produce an orbital angular momentum (OAM) to the optical signal,
wherein the second dichroic mirror is configured to couple a second portion of the pump radiation from a second pump radiation source to the second portion of the active optical fiber and to provide an output optical signal from the second portion of the section of the active optical fiber through the second mirror.

\* \* \* \* \*